(No Model.)
G. O. DRAPER.
SUPPORT FOR SPINNING SPINDLES.
No. 410,354. Patented Sept. 3, 1889.
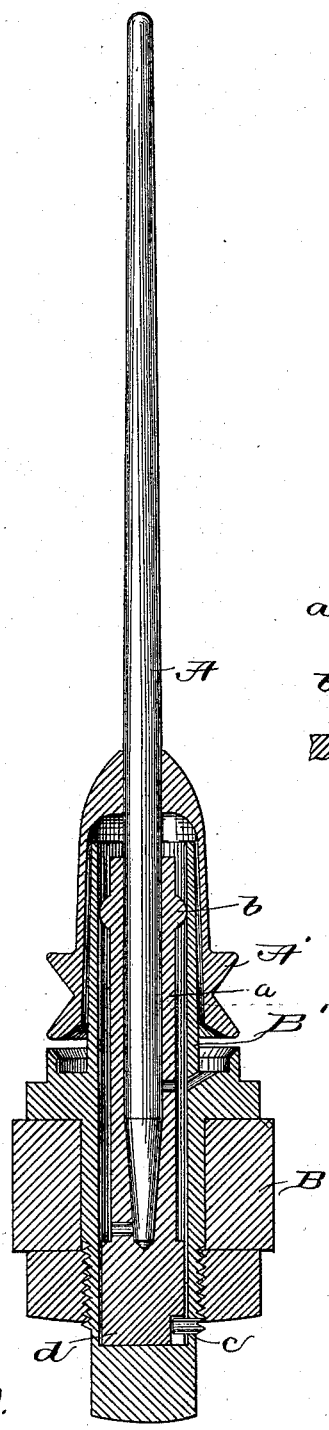
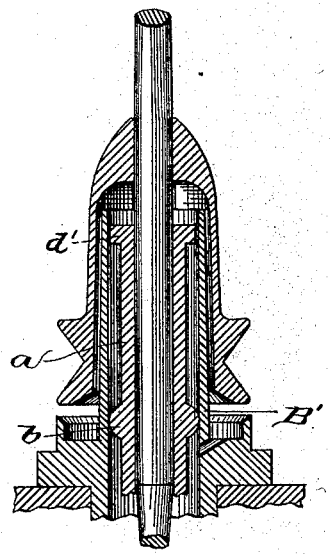
Witnesses.
Howard C. Eaton.
Frederick L. Emery.
Inventor:
George O. Draper,
by Crosby & Gregory Attys.

UNITED STATES PATENT OFFICE.

GEORGE OTIS DRAPER, OF HOPEDALE, MASSACHUSETTS, ASSIGNOR TO GEORGE DRAPER & SONS, OF SAME PLACE.

SUPPORT FOR SPINNING-SPINDLES.

SPECIFICATION forming part of Letters Patent No. 410,354, dated September 3, 1889.

Application filed June 5, 1889. Serial No. 313,178. (No model.)

*To all whom it may concern:*

Be it known that I, GEORGE OTIS DRAPER, of Hopedale, county of Worcester, State of Massachusetts, have invented an Improvement in Supports for Spinning-Spindles, of which the following description, in connection with the accompanying drawings, is a specification, like letters on the drawings representing like parts.

Prior to this invention bolster or lateral bearings projected up within the whirl, and within a supporting-case also extended into the whirl, have been provided with swells or enlargements made convex externally to constitute what is called a "ball bearing" or "surface" to contact with a supporting case or holder and form a tipping support for the bolster; but in all such cases, so far as I am aware, the swell on the bolster has been located substantially in the line of the band-pull on the whirl. When the ball-like portion of the lateral bearing is located substantially in the line of the band-pull, the spindle has too much liberty to tip or rock and the band in no way acts to prevent it.

In my experiments to employ to advantage a lateral bearing having a ball-like or equivalent projection to serve as a fulcrum upon which the lateral bearing may tip I have changed the position of the ball-like portion and have placed it at some distance from the line of the band-pull, and then to prevent the tension of the band from tipping the spindle so far that it could not be practically run I have provided another portion of the lateral bearing for the spindle with an enlargement or stop which substantially fills the space in the supporting-case in line with it, the said enlargement or stop being located so as to fall in a line at the opposite side of the band-pull from that occupied by the said ball-like or equivalent projection.

In my invention the tension of the band aids the spindle in keeping in contact with the interior of the lateral bearing, and in case of slight unevenness in the surfaces of the spindle and bearing which run in contact or any differences in loading the elasticity of the band enables the spindle to move to an extent sufficient to overcome undue jar or gyration, and at the same time the lateral bearing is also free to move to a limited extent, as necessity requires.

Figure 1, in partial elevation and section, represents a spindle and bearings therefor embodying my invention; and Fig. 2, a partial view of a modified form of bolster-bearing, wherein the ball is below the band-pull.

The spindle A has, as usual, an attached whirl A' of the sleeve class. The rail B has mounted upon it in usual manner a supporting case or holder P', within which is placed my improved bolster or lateral bearing a, to be described. The bolster or lateral bearing has a ball-like projection b, which, instead of being located, as usual, substantially in the line of the band-pull on the whirl, is located at some distance therefrom, and it may be either above the said line of band-pull, as in Fig. 1, or below it, as in Fig. 2; but in either case, to prevent the usual strain of the band deflecting the spindle too much out of vertical position with relation to the center of the usual ring, I provide a portion of the lateral bearing with an enlargement, as d, which substantially or nearly fills the space in the supporting-case at some point.

In Fig. 1 I have shown the lower portion d of the lateral bearing as nearly filling the supporting case or holder, whereas in Fig. 2, where the ball-bearing is below the line of band-pull, I have shown the upper end d' of the lateral bearing as substantially filling the supporting-case. The point where the bearing nearly fills the supporting-case, as described, will be at that side of the line of band-pull opposite that at which the ball-bearing is located.

By the term "ball-like" bearing I mean an enlargement upon the lateral bearing, which is so shaped externally as to constitute a fulcrum about which the lateral bearing may readily tip or rock.

To obviate the too great liberty of the spindle to tip or rock, as when the ball-like portion of the lateral bearing is in the line of the band-pull, I changed the position of the ball-like portion, so as to place it at some distance from the line of the band-pull, and then, to prevent the tension of the band from tipping the spindle so far that it could not be practically run, I have provided another portion of the lateral bearing for the spindle with an enlargement or stop which nearly or substantially fills the space in line with it in the supporting case or holder, so that the tension of the band no longer acts to tip the spindle out of proper position, as stated, but rather aids the spindle in keeping in contact with the interior of the lateral bearing.

A bolster made as a standard has had a ball-like bearing in a rail at a point below the whirl; but I do not claim, broadly, a ball-like bearing.

I claim—

A sleeve-whirl spindle and a supporting-case, combined with a lateral bearing having a ball-like portion located out of the line of the band-pull, and having an enlargement or stop thereon of a diameter to substantially fill the space in the said supporting-case, the said stop being located at one side of the line of band-pull opposite that where the said ball-like portion contacts with the supporting-case, substantially as described.

In testimony whereof I have signed my name to this specification in the presence of two subscribing witnesses.

GEO. OTIS DRAPER.

Witnesses:
E. D. BANCROFT,
H. F. SEARLES.